United States Patent [19]
Dai et al.

[11] Patent Number: 5,397,456
[45] Date of Patent: Mar. 14, 1995

[54] HYDROCONVERSION PROCESS EMPLOYING CATALYST WITH SPECIFIED PORE SIZE DISTRIBUTION

[75] Inventors: Pei-Shing E. Dai, Port Arthur; David E. Sherwood, Jr., Beaumont, both of Tex.

[73] Assignee: Texaco Inc., White Plains, N.Y.

[21] Appl. No.: 19,495

[22] Filed: Feb. 19, 1993

[51] Int. Cl.$^6$ .................. C10G 47/02; C10G 45/04
[52] U.S. Cl. .................. 208/108; 208/216 PP;251 H
[58] Field of Search ............ 208/108, 216 PP, 251 H

[56] References Cited

U.S. PATENT DOCUMENTS

| | | | |
|---|---|---|---|
| 4,306,965 | 12/1981 | Hensley, Jr. et al. | 208/216 R |
| 4,520,128 | 5/1985 | Morales et al. | 208/251 H |
| 5,047,142 | 9/1991 | Sherwood, Jr. et al. | 208/216 PP |

Primary Examiner—Asok Pal
Assistant Examiner—Walter D. Griffin
Attorney, Agent, or Firm—Kenneth R. Priem; Carl G. Seutter; Walter D. Hunter

[57] ABSTRACT

Heavy oils may be hydrotreated in the presence of a porous alumina support bearing metals of Group VIII and VI-B and optionally phosphorus, the catalyst having a Total Surface Area of 240–310 m$^2$/g, a Total Pore Volume of 0.5–0.75 cc/g, and a Pore Diameter Distribution whereby 63–78% of the Total Pore Volume is present as micropores of diameter 55–115A and 11–18% of the Total Pore Volume is present as macropores of diameter greater than 250A. The heavy oils and hydrogen are contacted with the catalyst such that the catalyst is maintained at isothermal conditions and is exposed to a uniform quality of feed. The process is particularly effective in achieving desired levels of hydroconversion of feedstock components having a boiling point greater than 1000° F. to products having a boiling point less than 1000° F.

14 Claims, No Drawings

HYDROCONVERSION PROCESS EMPLOYING CATALYST WITH SPECIFIED PORE SIZE DISTRIBUTION

FIELD OF THE INVENTION

This invention relates a process for hydrotreating a hydrocarbon feed. More particularly it relates to a hydroconversion process employing catalyst with a specified pore size distribution.

BACKGROUND OF THE INVENTION

As is well known to those skilled in the art, it is desired to convert heavy hydrocarbons, such as those having a boiling point above about 1000° F., into lighter hydrocarbons which are characterized by higher economic value. It is desirable to treat hydrocarbon feedstocks, particularly petroleum residue, to achieve other goals including hydrodesulfurization (HDS), hydrodenitrification (HDN), carbon residue reduction (CRR), and hydrodemetallation (HDM)—the latter particularly including removal of nickel compounds (HDNi) and vanadium compounds (HDV).

These processes typically employ hydrotreating catalysts with specified ranges of pores having relatively small diameters (i.e. micropores, herein defined as pores having diameters less than 250Å) and pores having relatively large diameters (i.e. macropores, herein defined as pores having diameters greater than 250Å).

U.S. Pat. No. 5,047,142 (to Texaco as assingee of Dai et al.), discloses a catalyst composition useful in the hydroprocessing of a sulfur and metal-containing feedstock comprising an oxide of nickel or cobalt and an oxide of molybdenum on a porous alumina support in such a manner that the molybdenum gradient of the catalyst has a value of less than 6.0 and 15-30% of the nickel or cobalt is in an acid extractable form, and having a surface area of 150-210 m²/g, a Total Pore Volume (TPV) of 0.50-0.75 cc/g, and a pore size distribution such that less than 25% TPV is in pores having diameters of less than 100Å, 70.0-85.0% TPV is in pores having diameters of 100A-160Å and 1.0-15.0% TPV is in pores having diameters of greater than 250Å.

U.S. Pat. No. 4,941,964 to Texaco as assignee of Dai et al discloses a process for the hydrotreatment of a sulfur- and metal-containing feed which comprises contacting said feed with hydrogen and a catalyst in a manner such that the catalyst is maintained at isothermal conditions and is exposed to a uniform quality of feed, the catalyst comprising an oxide of a Group VIII metal, an oxide of a Group VI-B metal and 0-2.0 weight % of an oxide of phosphorus on a porous alumina support, and having a surface area of 150-210 m²/g and a Total Pore Volume (TPV) of 0.50-0.75 cc/g such that 70-85% TPV is in pores having diameters of 100Å-160Å and 5.5-22.0% TPV is in pores having diameters of greater than 250A.

U.S. Pat. No. 4,738,944 (Robinson et al.) discloses a catalyst composition useful in the hydrotreatment of hydrocarbon oils, the catalyst containing nickel and phosphorus and about 19-21.5% Mo (calculated as the oxide) on a porous refractory oxide, having a narrow pore size distribution wherein at least 10% TPV is in pores having diameters less than 70Å, at least 75% TPV is in pores having diameters between 50-110Å, at least 60% TPV is in pores having diameters within about 20Å above and below the average pore diameter, and at most 25% TPV, most preferably less than 10% TPV is in pores having diameters greater than 110Å.

U.S. Pat. No. 4,652,545 (Lindsley et al.) discloses a catalyst composition useful in the hydroconversion of heavy oils, the catalyst containing 0.5-5% Ni or Co and 1.8-18% Mo (calculated as the oxides) on a porous alumina support, having 15-30% of the Ni or Co in an acid extractable form, and further characterized by having a Total Pore Volume (TPV) of 0.5-1.5 cc/g with a pore diameter distribution such that (i) at least 70% TPV is in pores having 80-120Å diameters, (ii) less than 0.03 cc/g of TPV is in pores having diameters of less than 80Å, and (iii) 0.05-0.1 cc/g of TPV is in pores having diameters of greater than 120Å.

U.S. Pat. No. 4,395,328 (Hensley, Jr. et al.) discloses a process for the hydroconversion of a hydrocarbon stream containing asphaltenes and a substantial amount of metals, comprising contacting the stream (in the presence of hydrogen) with a catalyst present in one or more fixed or ebullating beds, the catalyst comprising at least one metal which may be a Group VI-B or Group VIII metal, an oxide of phosphorus, and an alumina support, where the alumina support material initially had at least 0.8 cc/gm of TPV in pores having diameters of 0-1200Å, and at least 0.1 cc/gm of TPV is in pores having diameters of 1200-50,000Å, and the support material was heated with steam to increase the average pore diameter of the catalyst support material.

U.S. Pat. No. 4,341,625 (Tamm) discloses a process for hydrodesulfurizing a metal-containing hydrocarbon feedstock which comprises contacting the feedstock with a catalyst comprising at least one hydrogenation agent (i.e. Group VI-B or Group VIII metal, or combinations thereof) on a porous support, the catalyst being further characterized by having a TPV of 0.5-1.1 cc/g with at least 70% TPV in pores having diameters of 80-150Å and less than 3% TPV in pores having diameters greater than 1000Å.

U.S. Pat. No. 4,328,127 (Angevine et al.) discloses a catalyst composition for use in the hydrodemetallation-desulfurization of residual petroleum oils, the catalyst comprising a hydrogenating component (i.e. Group VI-B or Group VIII metal, or combinations thereof) on a porous support, and being further characterized by having a TPV of 0.45-1.5 cc/g with 40-75% TPV in pores having diameters of 150-200Å, and up to 5% TPV in pores having diameters of greater than 500Å.

U.S. Pat. No. 4,309,278 (Sawyer) discloses a process for the hydroconversion of a hydrocarbon feedstock comprising contacting the feedstock with hydrogen and a catalyst in a fixed bed, moving bed, ebullating bed, slurry, disperse phase, or fluidized bed reactor, where the catalyst comprises a hydrogenation component (i.e. Group VI-B or Group VIII metal) on a porous support, and is further characterized by having a TPV of 1.0-2.5 cc/g with no more than 0.05-0.20 cc/g of TPV in pores having diameters of greater than 400Å.

U.S. Pat. No. 4,306,965 (Hensley, Jr. et al.) discloses a process for the hydrotreatment of a hydrocarbon stream comprising contacting the stream with hydrogen and a catalyst, the catalyst comprising chromium, molybdenum, and at least one Group VIII metal on a porous support, and further characterized by having a TPV of 0.4-0.8 cc/g with 0-50% TPV in pores having diameters smaller than 50Å, 30-80% TPV in pores having diameters of 50-100Å, 0-50% TPV in pores having diameters of 100-150Å, and 0-20% TPV in pores having diameters greater than 150Å.

U.S. Pat. No. 4,297,242 (Hensley, Jr. et al.) discloses a 2-stage process for the catalytic hydrotreatment of hydrocarbon streams containing metal and sulfur compounds, the process comprising: (i) first contacting the feedstock with hydrogen and a demetallation catalyst comprising a Group VI-B and/or Group VIII metal; and (ii) thereafter reacting the effluent with a catalyst consisting essentially of at least one Group VI-B metal on a porous support, and having a TPV of 0.4–0.9 cc/g and a pore size distribution such that pores having diameters of 50–80Å constitute less than 40% TPV, pores having diameters of 80–100Å constitute 15–65% TPV, pores having diameters of 100–130Å constitute 10–50% TPV, and pores having diameters of greater than 130Å less than 15% TPV.

U.S. Pat. No. 4,089,774 (Oleck et al.) discloses a process for the demetallation and desulfurization of a hydrocarbon oil comprising contacting the oil with hydrogen and a catalyst, the catalyst comprising a Group VI-B metal and an iron group metal (i.e. iron, cobalt, or nickel) on a porous support, and having a surface area of 125–210 m²/g and TPV of 0.4–0.65 cc/g with at least 10% TPV in pores having diameters less than 30Å, at least 50% of pore volume accessible to mercury being in pores having diameters of 30–150Å, and at least 16.6% of pores accessible to mercury being in pores having diameters greater than 300Å.

U.S. Pat. No. 4,082,695 (Rosinski et al.) discloses a catalyst for use in the demetallation and desulfurization of petroleum oils, the catalyst comprising a hydrogenating component (i.e. cobalt and molybdenum) on a porous support, and having a surface area of 110–150 m²/g and a pore size distribution such that at least 60% of TPV is in pores having diameters of 100–200Å and not less than 5% TPV is in pores having diameters greater than 500Å.

U.S. Pat. No. 4,066,574 (Tamm) discloses a catalyst composition useful in the hydrodesulfurization of a hydrocarbon feedstock containing organometallic compounds, the catalyst comprising Group VI-B and Group VIII metal components on a porous support, and having a TPV of 0.5–1.1 cc/g with a pore diameter distribution such that at least 70% TPV is in pores of diameters of 80–150Å and less than 3% TPV is in pores having diameters greater than 1000Å.

U.S. Pat. No. 4,051,021 (Hamner) discloses a catalytic process for the hydrodesulfurization of a hydrocarbon feed which comprises contacting the feed with hydrogen and a catalyst, the catalyst comprising a Group VI-B and Group VIII metal on a porous support, and having a TPV of 0.3–1.0 cc/g with a pore diameter distribution such that greater than 50% TPV is in pores of diameters of 70–160Å, and pores having diameters below 70Å and above 160Å are minimized.

U.S. Pat. No. 4,048,060 (Riley) discloses a two-stage process for hydrodesulfurizing a heavy hydrocarbon feed which comprises: (i) contacting the feed with hydrogen and a first catalyst to produce a first hydrodesulfurized hydrocarbon product, the first catalyst comprising a Group VI-B and Group VIII metal on a porous support and having a mean pore diameter of 30–60Å; and (ii) contacting the first hydrodesulfurized hydrocarbon product with hydrogen and a second catalyst under hydrodesulfurization conditions, the second catalyst comprising a Group VI-B and Group VIII metal on a porous support and being further characterized by having a TPV of 0.45–1.50 cc/g with 0–0.5 cc/g of TPV in pores having diameters greater than 200Å, 0–0.05 cc/g of TPV in pores having diameters below 120Å, and at least 75% TPV in pores having diameters ±10Å of a mean pore diameter of 140–190Å.

U.S. Pat. No. 3,876,523 (Rosinski et al.) discloses a process for the demetallizing and desulfurizing of residual petroleum oil comprising contacting the oil with hydrogen and a catalyst, the catalyst comprising a Group VI-B and Group VIII metal on a porous support and having a pore size distribution such that greater than 60% TPV is in pores having diameters of 100–200Å, at least 5% TPV is in pores having diameters greater than 500Å, and 10% TPV or less is in pores having diameters less than 40Å, and the surface area of the catalyst is 40–150 m²/g.

U.S. Pat. No. 3,770,617 (Riley et al.) discloses a process for the desulfurization of a petroleum hydrocarbon feed comprising contacting the feed with hydrogen and a catalyst, the catalyst comprising a Group VI-B or Group VIII metal on a porous support and having greater than 50% TPV in pores of 30–80Å, less than 4% TPV in pores having diameters 200–2000Å, and at least 3% TPV in pores having diameters greater than 2000Å.

U.S. Pat. No. 3,692,698 (Riley et al.) discloses a catalyst useful in hydroprocessing of heavy feed stocks, the catalyst comprising a mixture of Group VI-B and Group VIII metals on a porous support and having a pore size distribution such that a major portion of its TPV is in pores of diameters ranging from 30–80Å, less than 4% TPV is in pores of diameters of 200–2000Å, and at least 3% TPV is in pores of diameters greater than 2000Å.

Early petroleum distillate hydrotreating catalysts generally were monomodal catalysts with very small micropore diameters (less than say 100Å) and rather broad pore size distributions. First generation petroleum resid hydrotreating catalysts were developed by introducing a large amount of macroporosity into a distillate hydrotreating catalyst pore structure to overcome the diffusion resistance of large molecules. Such catalysts, which are considered fully bimodal HDS/HDM catalysts, are typified by U.S. Pat. Nos. 4,395,328 and 4,089,774 supra.

Another approach to developing improved catalysts for petroleum resid processing has involved enlarging the micropore diameters of essentially monomodal catalysts (having no significant macroporosities) to overcome the above described diffusion limitations. Essentially monomodal catalysts with small micropore diameters and low macroporosities designed for improved petroleum resid HDS include those disclosed in U.S. Pat. Nos. 4,738,944; 4,652,545; 4,341,625; 4,309,378; 4,306,965; 4,297,242; 4,066,574; 4,051,021; 4,048,060 (1st stage catalyst); U.S. Pat. Nos. 3,770,617; and 3,692,698, supra. Essentially monomodal catalysts with larger micropore diameters and low macroporosities designed for improved petroleum resid HDM include those disclosed in U.S. Pat. Nos. 4,328,127; 4,309,278; 4,082,695; 4,048,060 (2nd stage catalyst); and U.S. Pat. No. 3,876,523, supra.

A recent approach to developing improved catalysts for petroleum resid processing has involved the use of catalysts having micropore diameters intermediate between the above described monomodal HDS and HDM catalysts, as well as sufficient macroporosities so as to overcome the diffusion limitations for petroleum bottoms HDS (i.e., sulfur removal from hydrocarbon product of a hydrotreated petroleum resid having a boiling point greater than 1000° F.) but limited macroporosities to limit poisoning of the interiors of the catalyst particles. Catalysts with micropore diameters intermediate between the above described monomodal HDS and HDM catalysts with limited macroporosities include those of U.S. Pat. No. 4,941,964 and U.S. Pat. No. 5,047,142 supra.

However, none of the above-identified catalyst types has been found to be effective for achieving desired levels of hydroconverison of feedstocks components having a boiling point greater than 1000° F. to products having a boiling point less than 1000° F.

It is an object of this invention to provide a process for hydrotreating a charge hydrocarbon feed. Other objects will be apparent to those skilled in the art.

STATEMENT OF THE INVENTION

In accordance with certain of its aspects, this invention is directed to a process for hydrotreating a charge hydrocarbon feed containing components boiling above 1000° F., and sulfur, metals, and carbon residue which comprises contacting said charge hydrocarbon feed with hydrogen at isothermal hydrotreating conditions in the presence of, as catalyst, a porous alumina support bearing 3-6 w % of a Group VIII metal oxide, 14.5-24 w % of a Group VI-B metal oxide, and 0-6 w % of a phosphorus oxide, said catalyst having a Total Surface Area of 240-310 m²/g, a Total Pore Volume of 0.5-0.75 cc/g, and a Pore Diameter Distribution whereby 63-78% of the Total Volume Pore is present as micropores of diameter 55-115Å and 11-18% of the Total Pore Volume is present as macropores of diameter greater than 250Å, thereby forming hydrotreated product containing decreased content of components boiling above 1000° F. and sulfur, metals, and carbon residue; and recovering said hydrotreated product containing decreased content of components boiling above 1000° F., and of sulfur, metals, and carbon residue.

DESCRIPTION OF THE INVENTION

The charge hydrocarbon feed which may be charged to the process of this invention may include heavy, high boiling petroleum cuts typified by gas oils, vacuum gas oils, petroleum cokes, residual oils, vacuum resid, etc. The process of this invention is particularly useful to treat high boiling oils which contain components boiling above 1000° F. to convert them to products boiling below 1000° F. The charge may be a petroleum fraction having an initial boiling point of above 650° F. characterized by presence of an undesirably high content of components boiling above 1000° F., and sulfur, carbon residue and metals; and such charge may be subjected to hydrodesulfurization (HDS).

It is a particular feature of the process of this invention that it may permit treating of hydrocarbon charge, particularly those containing components boiling above about 1000° F., to form product which is characterized by an increased content of components boiling below 1000° F. and by decreased content of undesirable components typified by sulfur, metals, and carbon residue.

A typical charge which may be utilized is an Arabian Medium/Heavy Vacuum Resid having the following properties:

TABLE

| Property | Value |
| --- | --- |
| API Gravity | 4.8 |
| 1000° F.+, vol % | 87.5 |
| 1000° F.+, w % | 88.5 |
| 1000° F.− w % | 11.5 |
| Sulfur, w % | 5.0 |
| Total Nitrogen, wppm | 4480 |
| Hydrogen, w % | 10.27 |
| Carbon, w % | 84.26 |
| Alcor MCR, w % | 22.2 |
| Kinematic Viscosity, cSt | |
| @ 212° F. | 2430 |
| @ 250° F. | 410 |
| @ 300° F. | 117 |
| Pour Point, °F. | 110 |
| n-$C_5$ Insolubles, w % | 28.4 |
| n-$C_7$ Insolubles, w % | 9.96 |
| Toluene Insolubles, w % | 0.02 |
| Asphaltenes, w % | 9.94 |
| Metals, wppm | |
| Ni | 49 |
| V | 134 |
| Fe | 10 |
| Cu | 3 |
| Na | 49 |
| Total Metals wppm | 245 |
| Chloride, wppm | 28 |

In practice of the process of this invention (as typically conducted in a Robinson reactor in pilot plant operations), the charge hydrocarbon feed is contacted with hydrogen at isothermal hydrotreating conditions in the presence of catalyst. Hydrogen is charged to the Robinson Reactor at a rate of 2000-10,000 SCFB, preferably 3000-8000, say 7000 SCFB. Temperature of operation is typically 700° F.-900° F., preferably 750° F.-875° F., say 770° F. Operation is isothermal and is carried out in an ebullated bed to this end. The temperature may typically vary throughout the bed by less than about 20° F. As an alternative to one or more ebullated beds, reaction may be carried out in one or more continuously stirred tank reactors (CSTR's) in which the catalyst is exposed to a uniform quality of feed. Pressure of operation may be 1500-10,000 psig, preferably 1800-2500 psig, say 2250 psig. Space velocity is typically 0.1-1.5, say 0.56 volumes of oil per hour per volume of reactor.

In one particularly preferred embodiment of the process of the instant invention, sulfur-and metal-containing hydrocarbon feedstock is catalytically hydrotreated with the above described catalyst using the H-OIL Process configuration. H-OIL is a proprietary ebullated bed process (co-owned by Hydrocarbon Research, Inc. and Texaco Development Corp.) for the catalytic hydrogenation of residua and heavy oils to produce upgraded distillate petroleum products. The ebullated bed system operates under essentially isothermal conditions and allows for exposure of catalyst particles to a uniform quality of feed.

In the H-OIL Process the residual oil is passed along with a hydrogen containing gas upwardly through a zone of ebullated hydrotreating catalyst at a reaction temperature of 750° F. to 875° F. The pressure is about 1500 psig to 10,000 psig and space velocity is 0.1 to 1.5 volume of oil per hour per volume of reactor. Hydrocarbon effluent is withdrawn from the zone of hydrogenation catalyst.

The catalyst support may be alumina. Although the alumina may be alpha, beta, theta, or gamma alumina, it is preferred to utilize gamma alumina.

The alumina substrate which may be employed is characterized by Total Surface Area, Total Pore Volume, and Pore Diameter Distribution. The Total Surface Area is 300–400, preferably 305–345, say 308 m²/g. The Total Pore Volume may be 0.8–1.2, preferably 0.9–1.0, say 0.92 cc/g.

The Pore Diameter Distribution is such that 63%–78%, preferably 67%–71%, say 68% of the Total Pore Volume is present as micropores of diameter of about 55–115Å.

Micropores of pore diameter less than 55Å are present in amount of 0–10.5%, preferably 1–6%, say 3% of Total Pore Volume.

Micropores of pore diameter of 100–160Å are present in amount of 10–25%, say 20.9%

Macropores of pore diameter greater than 160Å are present in amount of 11–25 %, say 19.6%.

Macropores of diameter of greater than about 250Å are present in amount of about 11–18% preferably 14%–18%, say 15% of the Total Pore Volume.

Macropores of diameter of 500–10,000Å are preferably present in amount of about 9%–14%, more preferably 9%–13%, say 12.7%.

It should be noted that the percentages of the several pores in the finished catalyst are essentially the same as in the charge gamma alumina substrate from which it is prepared—although the Total Surface Area of the finished catalyst may be 75%–85%, say 78.6% of the charge gamma alumina substrate from which it is prepared.

The alumina charge may be loaded with metals to yield a product catalyst containing a Group VIII metal oxide in amount of 3–6w %, preferably 3–3.5w %, a Group VI-B metal oxide in amount of 14.5–24%, preferably 14.5–16.5w % and phosphorous oxide ($P_2O_5$) in amount of 0–6w %, preferably 1.5–3 w %.

The non-noble Group VIII metal may be iron, cobalt, or nickel. This metal may be loaded onto the alumina typically from a 10%–30%, say 15% aqueous solution of a water soluble salt (e.g. a nitrate, acetate, oxalate etc.). The preferred metal may be nickel, employed as about a 16w % aqueous solution of nickel nitrate hexahydrate $Ni(NO_3)_2 \cdot 6H_2O$.

The Group VI-B metal may preferably be chromium, molybdenum, or tungsten, preferably molybdenum typically as a 10%–41%, say 27% aqueous solution of a water-soluble salt such as ammonium molybdate $(NH_4)_2MoO_4$.

The phosphorus component, when employed, may be employed as a 0%–4%, say 3w % aqueous solution of 85w % phosphoric acid $H_3PO_4$ in water.

These catalyst metals and phosphorus may be loaded onto the support by impregnating the latter with a solution of the former. Although it is preferred to load the metals and phosphorus simultaneously, it is possible to load each separately. It is preferred that the catalyst be impregnated by filling 90%–105%, preferably 97%–98%, say 97% of the substrate pore volume with the solution containing the requisite amounts of metals and phosphorus. Loading is followed by drying and calcining at 1000° F.–1150° F., say 1100° F. for 20 minutes–2 hours, say 30 minutes.

The catalyst may be evaluated in a Robinson Reactor, a Continuously Stirred Tank Reactor (CSTR) which evaluates catalyst deactivation at conditions simulating the first stage of a two-stage H-Oil ebullated bed Unit. The feedstock is an Arabian Med/Hvy Vacuum Resid of the type set forth above. Evaluation is carried out over 3–4 weeks to a catalyst age of about 4 bbl/lb.

In practice of the process of this invention, the catalyst, preferably in the form of extruded cylinders of 0.0038 inch diameter and 0.15 inch length may be placed within a reactor. The particle size distribution is typically: <0.5 mm 0.5w % max; <5.0 mm 5w % max; <1.6 mm 10w % max; <2.5 mm 40w % max; and >15 mm 10w % max. The hydrocarbon charge is admitted to the bed of the Robinson Reactor in liquid phase at 650° F.–850° F., preferably 700° F.–800° F., say 770° F. and 1500–3500 psig, preferably 2000–3000 psig, say 2250 psig. Hydrogen gas is admitted with the hydrocarbon charge in amount of 3000–10,000 SCFB, preferably 5000–8000 SCFB, say 7000 SCFB. The hydrocarbon charge passes through the bed at a LHSV of 0.1–3, preferably 0.3–2, say 0.56. During operation, isothermal conditions are maintained.

During passage through the Robinson reactor, the hydrocarbon feedstock may be converted to lower boiling products by the hydrotreating reaction. In a typical embodiment, a charge containing 60w %–95%, say 89w % boiling above 1000° F. and 0w %–30w %, say 12w % boiling in the 600° F.–1000° F. range may be converted to a hydrotreated product containing only 35w %–65w %, say 51w % boiling above 1000° F.

ADVANTAGES OF THE INVENTION

It will be apparent to those skilled in the art that this invention is characterized by advantages including the following:

(i) it permits attainment of increased yield of hydrocarbon products boiling below 1000° F.;

(ii) it permits operation to yield highly desulfurized hydrocarbon product;

(iii) it permits operation to yield hydrocarbon product characterized by a lower content of carbon residue;

(iv) it permits operation to yield hydrocarbon product characterized by lower content of metals.

Practice of the process of this this invention will be apparent to those skilled in the art from the following wherein all parts are parts by weight unless otherwise stated. Control examples are designated by an asterisk.

DESCRIPTION OF SPECIFIC EMBODIMENTS

EXAMPLE I

In this example which represents the best mode presently known of carrying out the process of this example, the charge hydrocarbon is the Arabian Medium/Heavy Vacuum Resid having the properties set forth in the table supra. It should be noted that this charge hydrocarbon is particularly characterized by the presence of 87.5 v % of components having a boiling point above 1000° F., by a sulfur content of 5 w %, and by a total metals content of 245 wppm.

The catalyst is prepared from a gamma alumina support having the properties set forth in the Table which follows which notes the Total Surface Area TSA in square meters per gram of alumina, Total Pore Volume TPV in cubic centimeters per gram, and the Pore Volume PV, based in percent of TPV, arising from pores of noted diameter (A).

TABLE

| Property | Value % Charge Alumina |
|---|---|
| TSA | 308 |
| TPV | 0.92 |

TABLE-continued

| Property | Value % Charge Alumina |
|---|---|
| PV < 55Å | 3.3 |
| PV 100A-160Å | 20.9 |
| PV 55A-115Å | 68 |
| PV > 250Å | 15.2 |
| PV > 160Å | 19.6 |
| PV 500Å-10,000 | 12.7 |
| PV < 160Å | 80 |

This alumina support is in the form of extrudates of diameter range of 0.035-0.041 inch.

Support is impregnated with a solution containing the requisite amounts of nickel, molybdenum, and phosphorus in amount to fill 97% of the substrate Total Pore Volume. The temperature of the wet extrudates is quickly raised to calcination temperature of about 1100° F. and held for 30 minutes—after which the catalyst is allowed to cool.

The product catalyst is characterized as follows:

TABLE

| Component | W % |
|---|---|
| $MoO_3$ | 14.5-16.5 |
| NiO | 3.0-3.5 |
| CoO | None |
| $SiO_2$ | $\leq 2.5$ |
| $SO_4$ | $\leq 0.8$ |
| $Na_2O$ | $\leq 0.1$ |
| $P_2O_5$ | 1.6 |
| TSA m²/g | 269 |
| TPV cc/g | 0.71 |
| PV < 55Å | 3.4% |
| PV 100A-160Å | 15.3% |
| PV 55A-115Å | 68.9% |
| PV > 250Å | 15.8% |
| PV > 160Å | 20.6% |
| PV 500Å-10,000Å | 11.3% |

This catalyst is placed within the reaction vessel (the Robinson Reactor) in which the feed is uniformly contacted with hydrogen at isothermal conditions.

Charge hydrocarbon is admitted in liquid phase at 770° F. and 2250 psig to the Robinson Reactor at a space velocity LHSV of 0.56 volumes of oil per hour per volume of liquid hold up in the Robinson Reactor. Hydrogen is admitted in amount of 7000 SCFB.

Product is collected and analyzed to yield the following data:

TABLE

| Property | Value |
|---|---|
| % Sulfur Removal | 64 |
| % Carbon Residue Reduction | 49 |
| % Ni Removal | 47.8 |
| % V Removal | 66.2 |
| % Hydroconversion of 1000° F.+ to 1000° F. - Materials | 44.9 |

TABLE-continued

| Property | Value |
|---|---|
| % Hydroconversion Advantage | 9.0 |

From the above Table, it is apparent that the process of the instant invention permits increasing the conversion of materials boiling above 1000° F. by 44.9%; and sulfur, carbon residue, and metals are removed.

Upon distillation to recover (i) a first cut form the initial boiling point to 650° F., (ii) a second cut form 650° F. to 1000° F., and (iii) a third cut above 1000° F., the following is noted:

TABLE

|  | EXAMPLE I | |
|---|---|---|
|  | Charge | Product |
| Cut 1: up to 650° F. | | |
| Sp. Gr. | | 0.85 |
| Sulfur w % | | 0.22 |
| Cut 2: 650° F.-1000° F. | | |
| Sp. Gr. | | 0.93 |
| Sulfur w % | | 0.80 |
| Cut 3: 1000° F.+ | | |
| Sp. Gr. | | 1.03 |
| Sulfur w % | | 3.32 |

From the above Table, it is apparent that the Sulfur content is decreased in all of the product fractions (from 5.0w % in the feed).

The process of this invention typically shows a Hydroconversion Advantage (when measured against the prior art commercial control catalyst of Example VI*) of 9.2±0.2 on a weight percent basis and 8.4±0.4 when measured on a volume basis when compared to the conversion levels obtained using a typical commercial ebullated bed catalyst.

The Hydroconversion Advantage is calculated as the weight or volume % of 1000° F.+ conversion of a particular example (X) minus the weight or volume % of 1000° F.+ conversion of a standard (Y) this difference being divided by the weight or volume of 1000° F.+ conversion of typical commercial ebullated bed catalyst example (X).

$$\text{Hydroconversion Advantage} = \frac{X - Y}{Y}$$

EXAMPLE II-VI*

In experimental Examples II-V, the catalyst is prepared as in Example I except that it contains different amounts of catalytic metals and different TPV, TSA, and Pore Size Distribution—all as set forth in the Table which follows. Also included is control Example VI* which utilizes a commercially available catalyst (the HDS-1443-B brand of catalyst marketed by Criterion Catalyst Co.).

TABLE II

| CATALYST PROPERTIES | | | | | | |
|---|---|---|---|---|---|---|
| Chem. Com. (wt. %): | I NiMoP | II CoMo | III NiMoP | IV NiMoP | V NiMo | VI* NiMo |
| $MoO_3$ | 14.5-16.5 | 14.5-16.5 | 14.5-16.5 | 14.5-16.5 | 14.5-16.5 | 11.5-14.5 |
| NiO | 3.0-3.5 | None | 3.0-3.5 | 3.0-3.5 | 3.0-3.5 | 3.2-4.0 |
| CoO | None | 3.0-3.5 | None | None | None | None |
| $SiO_2$ | $\leq 2.5$ | $\leq 2.5$ | $\leq 2.5$ | $\leq 2.5$ | $\leq 2.5$ | $\leq 1.0$ |
| $SO_4$ | $\leq 0.8$ | $\leq 0.8$ | $\leq 0.8$ | $\leq 0.8$ | $\leq 0.8$ | $\leq 0.8$ |
| $Na_2O$ | $\leq 0.1$ | $\leq 0.1$ | $\leq 0.1$ | $\leq 0.1$ | $\leq 0.1$ | $\leq 0.05$ |

TABLE II-continued

| Chem. Com. (wt. %): | I NiMoP | II CoMo | III NiMoP | IV NiMoP | V NiMo | VI* NiMo |
|---|---|---|---|---|---|---|
| $P_2O_5$ | 1.6 | ≦0.2 | 2.3 | 2.2 | 2.3 | ≦0.2 |
| Surface Area ($m^2/g$) | 269 | 301 | 242 | 268 | 261 | 314 |
| TPV (cc/g) | 0.71 | 0.73 | 0.67 | 0.67 | 0.67 | 0.74 |
| PV < 55Å (% TPV) | 3.4 | 6.2 | 1.7 | 4.9 | 4.3 | 25.1 |
| PV 100Å–160Å (% TPV) | 15.3 | 14.6 | 18.9 | 10.5 | 13.5 | 5.6 |
| PV 55Å–115Å (% TPV) | 68.9 | 64.9 | 70.2 | 69.2 | 69.4 | 34.9 |
| PV > 250Å (%TPV) | 15.8 | 16.0 | 15.9 | 16.4 | 16.3 | 34.1 |
| PV > 160Å (% TPV) | 20.6 | 21.2 | 19.8 | 20.7 | 20.2 | 37.4 |
| PV 500Å–10,00Å (% TPV) | 11.3 | 11.0 | 11.9 | 12.5 | 12.8 | 29.8 |

Pore Volume is determined using a Micromeritics Autopore 9220 mercury poroimeter.

The Hydroconversion Advantage calculated for Examples I, II, III and VI*:

TABLE

| | Hydroconversion Advantage | |
|---|---|---|
| Example | W % Basis | Vol % Basis |
| I | 9.2 ± 0.2 | 8.4 ± 0.4 |
| II | 7.5 | 6.7 |
| III | 8.2 | 7.4 |
| VI* (Basis) | 0 | 0 |

The Average Catalytic Activity in weight % is determined over the age range of 0.1–3.0 barrels per pound.

TABLE

| | Example | | |
|---|---|---|---|
| Property | I | II | VI* |
| % S Removal | 64 | 65 | 57.7 |
| % Carbon Residue Reduction | 49 | 45.7 | 40 |
| % Ni Removal | 47.8 | 47.2 | 49.4 |
| % V Removal | 66.2 | 66.6 | 73.8 |
| % Hydroconverion °F. 1000° F+ to 1000° F. Materials | 44.9 | 44.3 | 41.2 |
| Hydroconversion Advantage | 9 | 7.5 | 0.0 |

From the above Tables, the following conclusions may be drawn:

(i) The catalysts of Examples I–V of this invention permit attainment of desirable results when used in an isothermal hydrogen treating process wherein the catalyst is contacted with a uniform hydrogen feed;

(ii) the process of the instant invention permits attainment of hydroconversion of feedstock components having a boiling point above about 1000° F. to product components having a boiling point less than 1000° F.;

(iii) the process of the instant invention permits a high level of denickelization (HDNi) of the charge;

(iv) the process of the instant invention permits a high level of desulfurization (HDS) of the charge; and (v) the process of the instant invention permits a high level of carbon residue reduction (CRR).

Although this invention has been illustrated by reference to specific embodiments, it will be apparent to those skilled in the art that various charges and modifications may be made which clearly fall within the scope of the invention.

What is claimed:

1. A process for hydrotreating a charge hydrocarbon feed containing components boiling above 1000° F., and sulfur, and metals, and carbon residue which comprises contacting said charge hydrocarbon feed with hydrogen and a catalyst at isothermal hydrotreating conditions, said catalyst consisting essentially of 3–6w % of a Group VIII metal oxide, 14.5–24w % of molybdenum oxide, and 0–6w % of a phosphorus oxide all supported on a porous alumina support, said catalyst having a Total Surface Area of 240–310 $m^2/g$, a Total Pore Volume of 0.5–0.75 cc/g, and a Pore Diameter Distribution whereby 63–78% of the Total Pore Volume is present as micropores of diameter 55–115Å and 11–18% of the Total Pore Volume is present as macropores of diameter greater than 250Å, thereby forming hydrotreated product containing decreased content of components boiling above 1000° F. and sulfur, metals, and carbon residue; and recovering said hydrotreated product containing decreased content of components boiling above 1000° F., sulfur, metals and carbon residue.

2. A process as claimed in claim 1 wherein said Group VIII metal is present in amount of 3–3.5w % as oxide.

3. A process as claimed in claim 1 wherein said molybdenum oxide is present in amount of 14.5–16.5w %.

4. A process as claimed in claim 1 wherein said phosphorus oxide is present in amount of 1.5–3w %.

5. A process as claimed in claim 1 wherein said Group VIII metal is nickel or cobalt.

6. A process as claimed in claim 1 wherein said catalyst has a Total Surface Area of 240–280 $m^2/g$.

7. A process as claimed in claim 1 wherein said catalyst has a Total Pore Volume of 0.65–0.75 cc/g.

8. A process as claimed in claim 1 wherein the Total Pore Volume of said catalyst includes 63–78% of micropores of diameter of 55–115Å and 15–17% of macropores of diameter greater than 250Å.

9. A process as claimed in claim 1 wherein said contacting is carried out in at least one ebullated bed reactor.

10. A process of hydrotreating a charge hydrocarbon containing sulfur and metals which comprises contacting said charge hydrocarbon feed with hydrogen and a catalyst at isothermal hydrotreating conditions, said catalyst consisting essentially of 3–3.5% NiO or CoO, 14.5–16.5% MoO$_3$, and 1.5–3w % of P$_2$O$_5$ all supported on a porous alumina support, said catalyst having a Total Surface Area of 240–280 m$^2$/g, a Total Pore Volume of 0.65–0.75 cc/g, and a Pore Diameter Distribution whereby 63–78% of the Total Pore Volume is present as micropores of diameter 55–115Å and 15–17% of the Total Pore Volume is present as macropores of diameter greater than 250Å, thereby forming hydrotreated product containing decreased content of components boiling above 1000° F., and sulfur, metals and carbon residue; and recovering said hydrotreated product containing decreased content of components boiling above 1000° F., and sulfur, metals, and carbon residue.

11. A process for hydroconversion of a charge hydrocarbon feed of boiling point greater than 1000° F. to form product having a boiling point less than 1000° F. which comprises contacting said charge hydrocarbon feed with hydrogen and a catalyst at isothermal hydrotreating conditions, said catalyst consisting essentially of 3–6w % of a Group VIII metal oxide and 14.5–24w % of molybdenum oxide, said catalyst having a Total Surface Area of 240–310 m$^2$/g, a Total Pore Volume of 0.5–0.75 cc/g, and a Pore Diameter Distribution whereby 63–78% of the Total Pore Volume is present as micropores of diameter 55–115Å and 11–18% of the Total Pore Volume is present as macropores of diameter greater than 250Å, thereby forming hydrotreated product containing increased content of product having a boiling point less than 1000° F.; and recovering said forming hydrotreated product containing increased content of product having a boiling point less than 1000° F.

12. A process as claimed in claim 11 wherein said Group VIII metal is nickel or cobalt.

13. A process for hydroconversion of a charge hydrocarbon feed of boiling point greater than 1000° F. to form product having a boiling point less than 1000° F. which comprises contacting said charge hydrocarbon feed with hydrogen and a catalyst at isothermal hydrotreating conditions, said catalyst consisting essentially of a 3–3.5w % of NiO or CoO, 14.5–16.5w %, of MoO$_3$, and 1.5–3w % of P$_2$O$_5$, said catalyst having a Total Surface Area of 240–280 m$^2$/g, a Total Pore Volume of 0.65–0.75 cc/g and a Pore Diameter Distribution whereby 1–6% of the Total Pore Volume is present as micropores of diameter less than 55Å, 63–78% of the Total Pore Volume is present as micropores of diameter 55–115Å, 15–17% of the Total Pore Volume is present as macropores of diameter greater than 250Å, and 10–14% of the Total Pore Volume is present in macropores of diameter 500–10,000Å, thereby forming hydrotreated product containing increased content of product having a boiling point less than 1000° F.; and recovering said hydrotreated product containing increased content of product having a boiling point less than 1000° F.

14. A process as claimed in claim 13 wherein said contacting is carried out in 2–5 ebullated-bed reactors in series.

* * * * *